(12) United States Patent
Schabernack et al.

(10) Patent No.: US 6,675,190 B1
(45) Date of Patent: Jan. 6, 2004

(54) METHOD FOR COOPERATIVE MULTITASKING IN A COMMUNICATIONS NETWORK, AND A NETWORK ELEMENT FOR CARRYING OUT THE METHOD

(75) Inventors: Jörg Schabernack, Vaihingen/Enz (DE); Reimund Klamt, Freiberg/Neckar (DE); Hartmut Dr. Kocher, Leonberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/414,311

(22) Filed: Oct. 7, 1999

(30) Foreign Application Priority Data

Oct. 8, 1998 (DE) .......................................... 198 46 274

(51) Int. Cl.$^7$ ............................................... G06F 9/00
(52) U.S. Cl. ..................................................... 709/102
(58) Field of Search .............................. 709/102, 103, 709/104, 107, 100

(56) References Cited

U.S. PATENT DOCUMENTS 5,437,032 A     7/1995  Wolf et al.
6,105,048 A  *  8/2000  He ............................. 709/100

FOREIGN PATENT DOCUMENTS

EP        0 658 841 A2      6/1995

OTHER PUBLICATIONS

A. Silberschatz et al, Operating System Concepts, $3^{rd}$ Edition 1991, Chapter 4.2.3, pp. 96–97.
M. P. Bosse et al, "Management of SDH Network Elements: An Application of Information Modelling", Alcatel Electrical Communication, $4^{th}$ Quarter 1993; pp. 329–338.
H. M. Deitel, "An Introduction to Operating Systems", 1990, Chapter 10,–Job and Processor Scheduling pp. 285–304.

* cited by examiner

Primary Examiner—Zarni Maung
Assistant Examiner—G. Lawrence Opie
(74) Attorney, Agent, or Firm—Sughrue Mion, PLLC

(57) ABSTRACT

Instead of a conventional task scheduler in which tasks having a high priority are preferentially scheduled, so that the execution of tasks with very low priorities is blocked, a "fair scheduler" is proposed in which each task (TA to TE) is assigned a counter (CNT) and a threshold value (THD), with the threshold value specifying a maximum number of execute cycles within which the task need not be executed immediately, and the counter counting those execute cycles within which the task is not executed. At the beginning of each execute cycle, a test is made to determine whether one of the counters exceeds the associated threshold value. If that is the case, one (TD) of the corresponding tasks (TC, TD) is selected by a selection criterion and executed, and its counter is reset. The counters assigned to the remaining tasks are incremented by one, and the execute cycle is repeated if it is found that at least one more of the tasks (TC) is waiting to be processed.

10 Claims, 2 Drawing Sheets

METHOD FOR COOPERATIVE MULTITASKING IN A COMMUNICATIONS NETWORK, AND A NETWORK ELEMENT FOR CARRYING OUT THE METHOD

BACKGROUND OF THE INVENTION

In digital communications networks, particularly in SDH networks (SDH: Synchronous Digital Hierarchy), a database containing data about the current network configuration is provided for each network element. To manage a network element, several scheduler tasks must be processed in parallel. To accomplish this, use is made of operating systems, such as UNIX or MACH, which control access to one or more processors using so-called threads. These operating systems are known per se and are described in many forms in the literature, for example in a book by A. Silberschatz et al, "Operating System Concepts", $3^{rd}$ Edition, 1991, Addison-Wesley Publishing Company, Reading, Mass., USA, Chapter 4.2.3, pages 96–97. With the aid of such operating systems, access by two or more scheduler tasks to one processor is controlled in such a way that for each task currently using the processor, a decision is made as to when the processor is freed for the next task. For this mode of operation, the term "cooperative multitasking" is used. The order in which the tasks are executed is determined by a control module, a so-called task scheduler.

Such a control module and a method for cooperative multitasking are disclosed in U.S. Pat. No. 5,437,032. There, two or more scheduler tasks are combined into jobs. Each job is assigned a weight in accordance with a priority. Its share of the total weight of all jobs corresponds to the actual level of multitasking activity. A desired level of multitasking activity is defined which corresponds to the maximum number of tasks that can be executed concurrently. The discrepancy between these two levels is used to determine the order in which the jobs are executed. Jobs whose actual level of multitasking activity differs greatly from the desired level are preferentially scheduled for execution. In the method disclosed in U.S. Pat. No. 5,437,032, it may happen that individual tasks are not executed because their lobs have only a very small discrepancy and are always dealt with after jobs with a large discrepancy.

In an article by M. P. Bosse et al, "Management von SDH-Netzelementen: eine Anwendung der Informationsmodellierung", Elektrisches Nachrichtenwesen, a journal published by the applicant, $4^{th}$ Quarter 1993, pages 329–338, a method of and apparatus for managing network elements in digital communications networks are described. A task scheduler is not described there, however.

SUMMARY OF THE INVENTION

It is an object of the invention to provide a method and apparatus for cooperative multitasking in a communications network which do not have the above disadvantages.

This object is attained by a method with the features according to claim 1 and by a network element with the features according to the independent claim.

Accordingly, each scheduler task is assigned a counter and a threshold value, with the threshold value specifying a maximum number of execute cycles within which the task need not be executed immediately, and the counter counting those execute cycles within which the task is not executed. At the beginning of each execute cycle, a test is made to determine whether at least one of the counters exceeds the associated threshold value. If that is the case for a single task, this task will be executed and its counter will be reset. If that is the case for at least two tasks, one of the set of tasks will be selected by at least one selection criterion. This task will then be executed and its counter will be reset. The counters assigned to the remaining tasks, i.e., the tasks awaiting execution, are incremented by one count. The execute cycle will be repeated if it is determined that at least one more of the tasks is waiting to be processed.

The waiting times are thus monitored by means of the counters, and those tasks which have been waiting longer than a time determined by the threshold value are given priority. In addition, a selection criterion is taken into account to define the order if none of the tasks is to be given priority in view of the waiting times.

Further advantageous features of the invention are apparent from the subclaims.

Accordingly, it is particularly advantageous if the selection criterion is a priority criterion according to which a test is made to determine the order in which the tasks will be executed. Thus, of those tasks whose counts are greater than the associated threshold values, first the very important tasks and then the less important tasks are processed.

In another preferred embodiment of the invention, the selection criterion is a time period that indicates how long each task stays in a wait loop, and according to which it is determined which task will be executed next. The order of execution is thus determined by the positions of the tasks in a wait loop. Through this round-robin principle, a task can be incorporated into the process in a very simple manner.

Advantageously, each threshold value is a number less than the total number N of tasks to be executed by not more than one, and all threshold values are increased by at least one if another task is waiting to be executed. These measures ensure that all tasks that are waiting to be executed profit from the cooperative multitasking and are processed within as short a time as possible.

If the number N increases by one (N=N+1) because another task is waiting to be processed, it is particularly advantageous to increase only those threshold values by one which are less than or equal to N−1. This allows all tasks to be executed within as few execute cycles as possible.

Particularly advantageously, a single task is taken into account only on the occurrence of an event that necessitates processing this task. This means that specific tasks can be deferred until the occurrence of expected events that make it necessary to process these specific tasks. For instance, system alerts or emergency alarms may occur, for which special scheduler tasks are available. These tasks are suspended until the occurrence of the events. In this very simple manner, the method is extended to a larger set of tasks without these specific tasks having to be constantly managed and without the control module ("task scheduler") being additionally loaded.

In another preferred embodiment of the invention, a task is taken into account as a task to be executed only when a predeterminable time interval has expired. This means that the task is deactivated until the expiration of the time interval. The event is, for example, the expiration of a predeterminable maintenance interval, and the task executes a maintenance routine.

BRIEF DESCRIPTION OF THE DRAWING

The invention will become more apparent from the following description of an embodiment when taken in conjunction with the accompanying drawings, in which.

DETAILED DESCRIPTION OF THE INVENTION

To simplify the following description of the embodiment, the scheduler tasks are called "tasks" for short.

Figure 1:
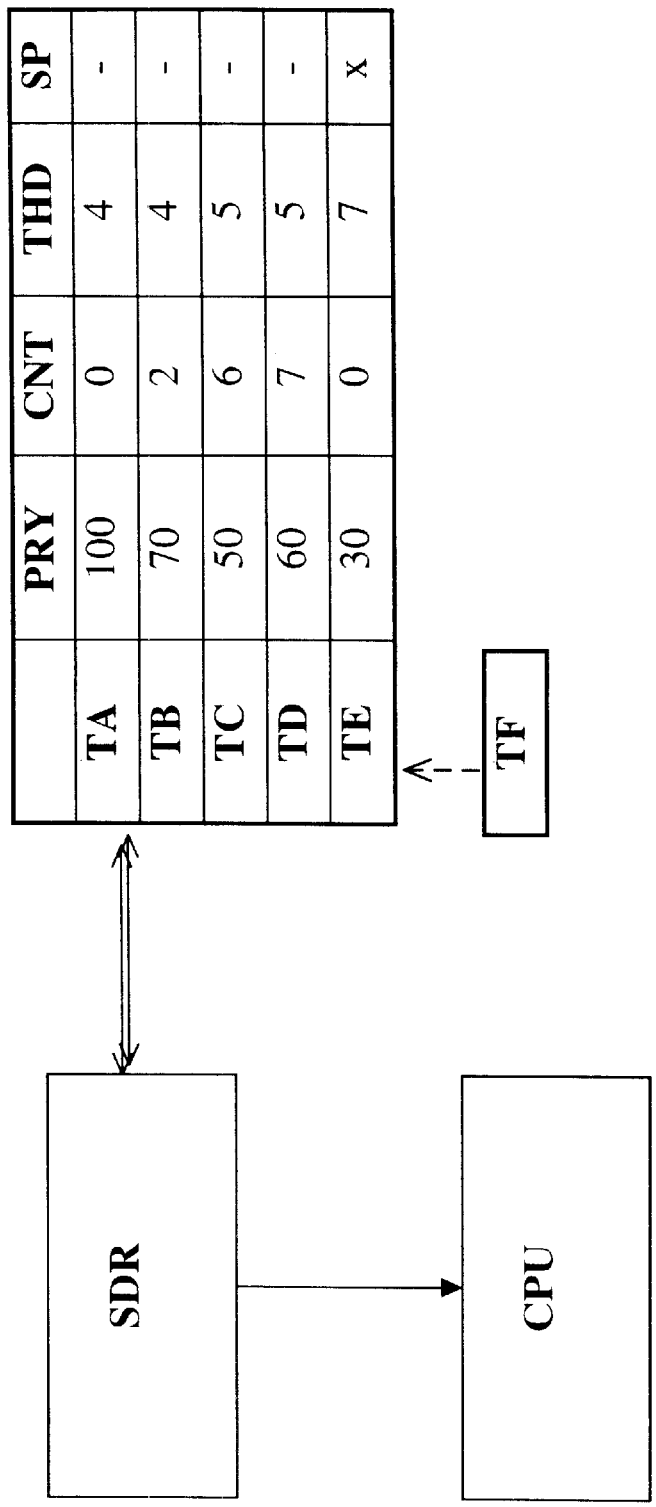
FIG. 1 shows schematically the structure of a network element with a control module.

FIG. 1 shows schematically the structure of a network element NE for a digital communications network. The network element NE comprises a processor CPU and a control module SDR for cooperative multitasking wherein the processor executes tasks in an order determined by the control module. To this end, the control module accesses a memory (not shown) in which a list is stored. The list is shown schematically in FIG. 1. In this list, only tasks that are waiting to be processed are entered. Individual tasks can be deactivated temporarily or in response to events.

As can be seen in FIG. 1, the list contains three different parameters for each of the tasks TA, TB, TC, TD, and TE. The first parameter PRY indicates the priority of the respective task. The second parameter CMT is a counter that is incremented by one on each execute cycle. The counter thus indicates for each of the tasks how many execute cycles have already been completed without this task being executed. The task TB, for example, has been waiting to be processed for two execute cycles (CNT=2). The third parameter THD is a preset threshold value that specifies the maximum number of execute cycles within which the task need not be executed. The task TD, for example, has been assigned a threshold value of THD=5. This means that the task TD can wait five execute cycles.

The tasks TA to TD are active, i.e., they are waiting to be executed. The task TE is inactive, i.e., it is not waiting to be executed and is in a suspended state. The status "active" or "inactive" is indicated in the list by a flag SP.

As can be seen in FIG. 1, the task TA has been assigned the priority PRY=100 and the threshold value THD=4. The count of the counter is CNT=0. This means that the task TA can wait five execute cycles until the counter CNT exceeds the threshold value THD. Only then should the task TA be executed as quickly as possible. The order in which the tasks are executed depends on the level of the priority PRY. For task TB, the list contains the following entries: PRY=70, CNT=2, and THD=4. The entries for task TC are: PRY=50, CNT=6, and THD=5. For task TD, the entries are: PRY=60, CNT=7; and THD=5. And for task TE, the parameters PRY=30, CNT=0, and THD=7 have been entered. This means that in the case of task TA and TB, the counters CNT have not yet exceeded the associated threshold value THD. The counter for task TE is also below the threshold value, namely "0". For this task TE, the counter remains at zero as long as this task is deactivated. The deactivated state of task TE is indicated by the flag SP. The counters of the tasks TC and TD have exceeded the associated threshold value, so that these tasks must be processed as quickly as possible.

Since the task TD has a higher priority PRY than the task TC, the task TD is executed first. At the end of the execute cycle, the counter for task TD is set to zero and the counters for the other tasks TA, TB, and TC are incremented by one. The counter for task TE remains unchanged at zero until this task TE is activated by an event.

The tasks TA to TE given in FIG. 1 are waiting to be processed and are performed by the network element NE to control or monitor transmissions in an SDH communications network. Each task uses one or more so-called managed objects according to a method as is known per se from an article by M. P. Bosse et al, "Management von SDH-Netzelementen: eine Anwendung der Informationsmodellierung", Elektrisches Nachrichtenwesen, a journal published by the applicant, $4^{th}$ Quarter 1993, pages 329 to 338.

Also shown in FIG. 1 is a task TF, which is to be added to the list shown. To this end, this task TF is assigned the parameters PRY, CNT, and THD. In the event of such an extension of the list, the threshold values THD are adapted to the total number N of tasks to be processed. Preferably, each threshold value should be less than the total number of tasks to be processed by not more than one (THD≧N−1). In the example being described, the total number of tasks TA to TE is 5 (N=5), and is increased to 6 (N'=6) when the task TE is added.

The method carried out by the network element shown in FIG. 1 will now be described in more detail with reference to FIG. 2.

Figure 2:
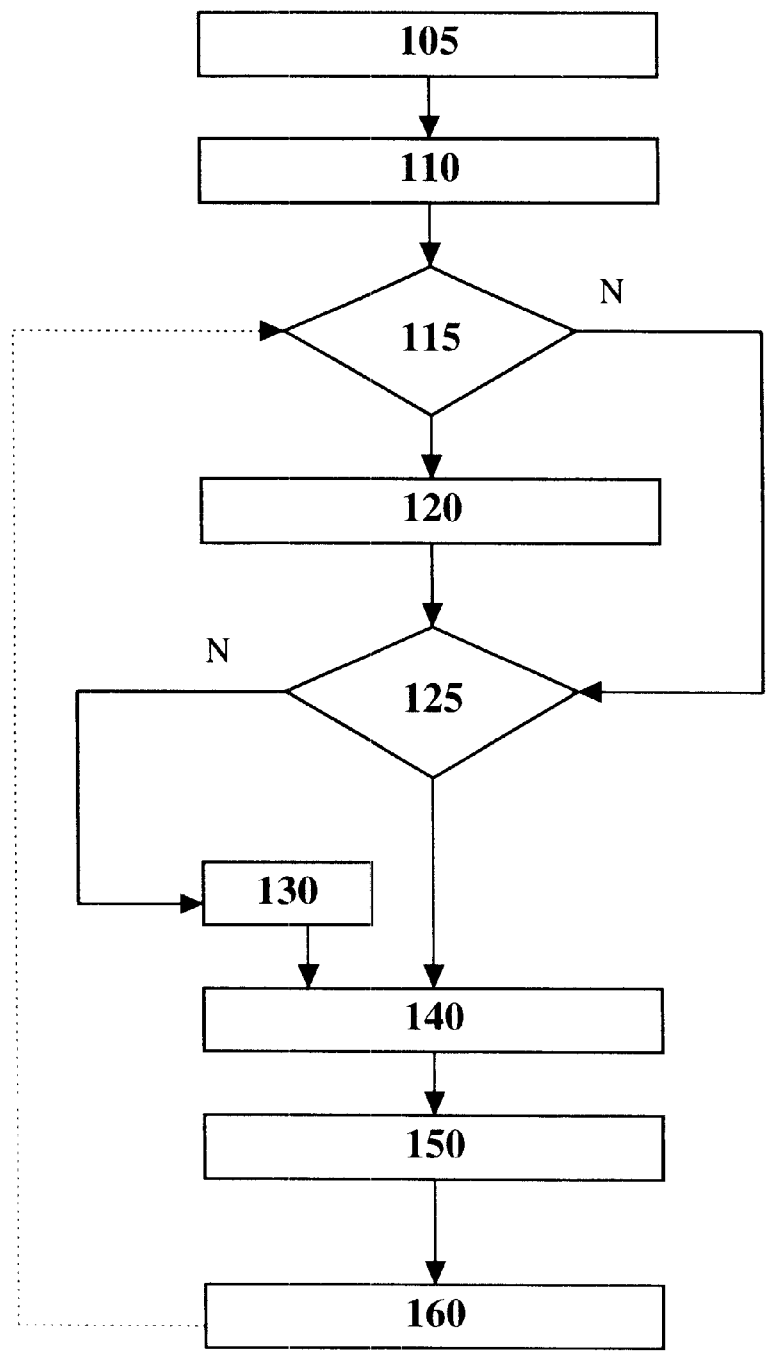
FIG. 2 shows the flowchart for a multitasking process that controls the control module.

FIG. 2 shows a flowchart of a method 100 for implementing cooperative multitasking. The method comprises steps 105 to 160. In a first step 105, a preselection is made such that only tasks that are waiting to be processed, i.e., that are currently being managed by the network element, are taken into account. In this example, these are all tasks TA to TE shown in FIG. 1. In a next step 110, the counter CNT and the threshold value THD are set for each task. In addition, each task is assigned a priority PRY. These parameters are entered in the list shown in FIG. 1. As already described with reference to FIG. 1, the task TA has the following parameters: PRY=100, CNT=0, and THD=4. The other tasks TB to TE, too, are assigned parameters according to the list of FIG. 1.

In a next step 115, it is determined for each task whether its counter CNT exceeds the threshold value THD. In this example, the counter for task TC exceeds the associated threshold value. The same applies to the counter for task TD. A selection is thus made, so that in a next step 120, only those tasks which satisfy this criterion are taken into account. In this example, the tasks that have to be processed are TC and TD.

To determine a ranking, in a subsequent step 125, a test is made to see whether the priorities PRY of these two tasks TC and TD differ. If that is the case, a priority list (not shown) is created. In this example, the task TD is entered in the priority list first, since its priority PRY=60 is greater than the priority of task TC (PRY=50). Accordingly, task TD is preferentially executed in a step 140.

If the priorities should be identical, however, the tasks will be executed according to the round-robin scheme, which is known per se. This means that the order of execution is determined by the chronological order in which the tasks were entered in the list. This list is processed in a step 130. Then, the preferred task is executed in step 140. Round-robin scheduling is described, for example, in Chapter 10.10 of a book by H. M. Deitel, "An Introduction to Operating Systems", Second Edition, 1990, Addison-Wesley Publishing Company, Reading, Mass., USA.

The task to be given preference, here task TD, is thus executed in step 140, with its counter CNT being reset to zero after execution. In a next step 150, the counters that where assigned to the other, waiting tasks are incremented by one. Other or suspended tasks will be executed only if no task with a threshold value greater than zero is waiting.

This is followed by step 160, in which the proper execution of the tasks is checked, and then by a branch back to step 115. This completes the execute cycle for a task. Then, the execute cycle for the next task begins with step 115. Again, a test is made to determine whether individual counters are greater than the associated threshold values. Should it be determined in step 115 that none of the counters exceeds the associated threshold value, then step 125 will be performed, in which the differences between the priorities are determined to create the priority list. If it should be determined in this step 125, too, that all priorities are identical, step 130 will be performed, in which the tasks are further executed on the round-robin principle.

The method 100 described ensures that all tasks to be processed will be executed by the network element even if individual tasks have a very high priority. High-priority tasks cannot block the processing of tasks with very low priorities. Thus, the function of the network element performed by the method described could be referred to as "fair scheduling". If all priorities are identical, conventional round-robin scheduling is used. Thus, the execution of the tasks is based on three different criteria, namely the waiting time (represented by the count CNT), the priority (represented by the priority parameter PRY), and the incorporation of the task into the processing loop (round-robin principle).

The waiting-time criterion has priority over the priority criterion, and the latter, in turn, has priority over the round-robin principle. The method may be modified by choosing another ranking of the criteria. For example, the priority criterion could have priority over the waiting-time criterion and the round-robin criterion. It is also conceivable to incorporate tests for further criteria into the method.

The method described is especially suited for use in an SDH network element to implement fair scheduling. Other applications are conceivable in which a conventional task scheduler has so far been used. Therefore, the invention is especially suited for use in UNIX- or MACH-operated systems.

What is claimed is:

1. A method for cooperative multitasking in a computer-controlled network element of a digital communications network wherein scheduler tasks are executed in a determined order, the method comprising the steps of:
   (a) assigning a counter and a threshold value to each scheduler task, the threshold value specifying a maximum number of execute cycles within which the scheduler task need not be executed immediately, and the counter counting those execute cycles within which the scheduler task is not executed;
   (b) determining at the beginning of each execute cycle whether at least one of the counters exceeds the associated threshold value;
   (c) if it is determined that at least one of the counters exceeds the associated threshold value, selecting one of the corresponding scheduler tasks having the counter which exceeds the associated threshold value according to at least one selection criterion, executing the selected scheduler task, and resetting the counter of the selected scheduler task;
   (d) incrementing by one the counters assigned to the remaining scheduler tasks which were not executed; and
   (e) repeating steps (a) through (d) if it is determined that at least one of the scheduler tasks is waiting to be executed.

2. A method as claimed in claim 1 wherein the selection criterion is a priority criterion according to which a test is made to determine the order in which the scheduler tasks will be executed.

3. A method as claimed in claim 1 wherein the selection criterion is the time period that indicates how long each scheduler task stays in a wait loop, and on the basis of which it is determined which scheduler task will be executed next.

4. A method as claimed in claim 1 wherein each threshold value is a number less than the total number of scheduler tasks to be executed by not more than one, and wherein all threshold values are increased by one if another scheduler task is added.

5. A method as claimed in claim 1 wherein the number of scheduler tasks is increased by one if another scheduler task is waiting to be executed, and wherein only those threshold values are then increased by one which are less than or equal to the increased number.

6. A method as claimed in claim 1 wherein all threshold values are increased only on the occurrence of an event that requires the execution of the additional scheduler task.

7. A method as claimed in claim 1 wherein a single scheduler task is taken into account only on the occurrence of an event that requires the execution of this scheduler task.

8. A method as claimed in claim 1 wherein a scheduler task is taken into account as a task to be executed only when a predetermined time interval has expired.

9. A network element for a digital communications network, comprising at least one processor and a control module for implementing cooperative multitasking, wherein the processor executes scheduler tasks in an order determined by the control module, wherein for the determination of the order, the control module assigns a counter and a threshold value to each scheduler task, the threshold value specifying a maximum number of execute cycles within which the scheduler task need not be executed immediately, and the counter counting the execute cycles within which the scheduler task is not executed, wherein the control module determines at the beginning of the execute cycle whether at least one of the counters exceeds the associated threshold value, wherein, if it is determined that at least one of the counters exceeds the associated threshold value, the processor selects one of the corresponding scheduler tasks by at least one selection criterion and executes the selected scheduler task, the control module resets the counter of said selected scheduler task which is executed, wherein at the end of the execute cycle, the counters assigned to the other scheduler tasks which were not executed are incremented by one, and wherein the control module controls a repetition of the execute cycle if it determines that at least one of the scheduler tasks is waiting to be executed.

10. A network element as claimed in claim 9 wherein at least two interconnected processors access at least two databases to execute the scheduler tasks using cooperative multitasking, and wherein one of the processors accesses the control module to determine the order in which the scheduler tasks will be executed.

* * * * *